(12) United States Patent
Adsit et al.

(10) Patent No.: US 6,331,026 B1
(45) Date of Patent: Dec. 18, 2001

(54) ROOF STORAGE COMPARTMENT ASSEMBLY FOR VEHICLES

(75) Inventors: Daniel Mark Adsit, Ann Arbor; Michael D. Yaroch, Livonia, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/653,655

(22) Filed: Sep. 1, 2000

(51) Int. Cl.⁷ ........................................................ B60N 3/12
(52) U.S. Cl. ........................ 296/37.7; 296/37.8; 296/37.1
(58) Field of Search ................................ 296/37.7, 37.8, 296/37.1

(56) References Cited

U.S. PATENT DOCUMENTS

| | | | | |
|---|---|---|---|---|
| 1,086,128 | * | 2/1914 | Binns | 296/37.7 |
| 1,762,640 | * | 6/1930 | Sanford | 296/37.7 |
| 1,964,339 | * | 6/1934 | Brassell | 296/37.7 |
| 2,236,428 | * | 3/1941 | Haas | 296/37.7 |
| 2,963,314 | * | 12/1960 | Richardson | 296/37.7 |
| 3,715,044 | * | 2/1973 | Simons | 214/450 |
| 3,773,378 | * | 11/1973 | Lewis | 296/37.7 |
| 3,809,425 | * | 5/1974 | Blaschke | 296/22 |
| 4,039,096 | * | 8/1977 | McAllister | 214/450 |
| 4,139,229 | | 2/1979 | Cooper . | |
| 4,305,695 | * | 12/1981 | Zachrich | 296/37.1 |
| 5,172,952 | * | 12/1992 | Lasnetski | 296/37.7 |
| 5,207,470 | * | 5/1993 | Rafi-Zadeh | 296/37.7 |
| 5,310,234 | * | 5/1994 | Klein | 296/37.7 |
| 5,348,207 | * | 9/1994 | Frank | 224/310 |
| 5,417,358 | * | 5/1995 | Haselgrove | 224/310 |
| 5,466,028 | * | 11/1995 | Nicopolis | 296/37.7 |
| 5,673,831 | * | 10/1997 | Spratt | 224/310 |
| 5,829,813 | * | 11/1998 | Lavalle | 296/37.7 |
| 5,957,558 | * | 9/1999 | Quade | 312/323 |
| 6,135,528 | * | 10/2000 | Sobieski et al. | 296/37.7 |
| 6,157,418 | * | 12/2000 | Rosen | 296/37.7 |
| 6,176,536 | * | 1/2001 | Miller et al. | 296/37.7 |

FOREIGN PATENT DOCUMENTS

| | | | | |
|---|---|---|---|---|
| 004111581 | * | 2/1991 | (EP) | 296/37.7 |
| 679698 | * | 1/1930 | (FR) | 296/37.7 |
| 679698 | | 4/1930 | (FR) . | |
| 0202950 | * | 11/1984 | (JP) | 296/37.7 |
| 404103432 | * | 4/1992 | (JP) | 296/37.7 |

* cited by examiner

Primary Examiner—Joseph D. Pape
Assistant Examiner—Kiran B. Patel
(74) Attorney, Agent, or Firm—David B. Kelley

(57) ABSTRACT

A roof storage compartment assembly is provided for a vehicle having a roof. The roof storage compartment assembly includes a plurality of storage compartments to be operatively connected to the roof and one of the storage compartments being a tray assembly to be disposed within the vehicle and for pivotal connection to the roof.

18 Claims, 3 Drawing Sheets

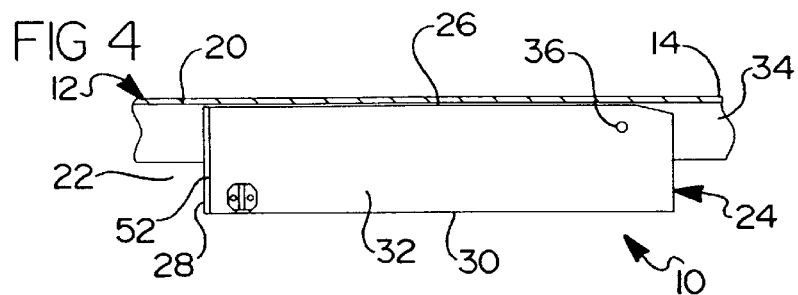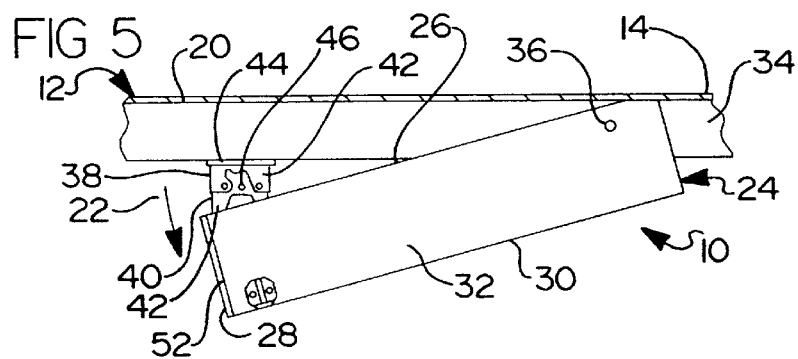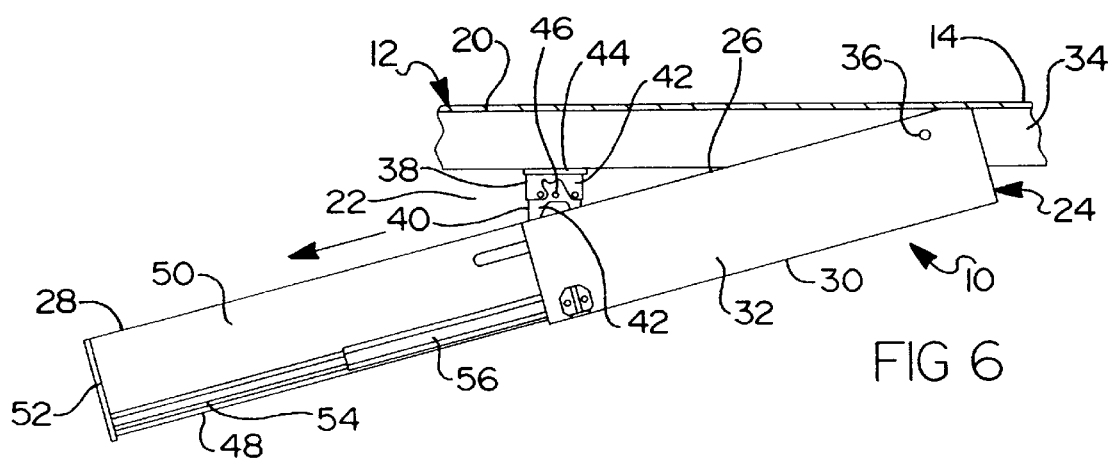

ROOF STORAGE COMPARTMENT ASSEMBLY FOR VEHICLES

BACKGROUND OF THE INVENTION

1. Field of the Invention

The present invention relates generally to storage compartments for vehicles and, more specifically, to a roof storage compartment assembly for a vehicle.

2. Description of the Related Art

It is known to provide a roof top cargo carrier for a vehicle such as a van. Typically, the roof top cargo carrier is mounted externally to a top or outer surface of a roof of the van. The roof top cargo carrier allows either objects to be secured thereto or objects to be contained therein. However, one disadvantage of these roof top cargo carriers is that they add a great deal of height to the vehicles, often making the vehicles difficult to store in a garage and load. Therefore, there is a need in the art to provide a roof storage compartment for a vehicle to improve storage in the vehicle.

SUMMARY OF THE INVENTION

Accordingly, the present invention is a roof storage compartment assembly for a vehicle having a roof. The roof storage compartment assembly includes a plurality of storage compartments to be operatively connected to the roof and one of the storage compartments being a tray assembly to be disposed within the vehicle and for pivotal connection to the roof.

One advantage of the present invention is that a roof storage compartment assembly is provided for a vehicle such as a van. Another advantage of the present invention is that the roof storage compartment assembly incorporates a roof top storage compartment built into the vehicle with a pull out counter-weight tray for easy operation. Yet another advantage of the present invention is that the roof storage compartment assembly has a lower profile, allowing the vehicle to be stored easily in a garage and has a built in cargo tray for easy access.

Other features and advantages of the present invention will be readily appreciated, as the same becomes better understood, after reading the subsequent description when taken in conjunction with the accompanying drawings.

BRIEF DESCRIPTION OF THE DRAWINGS

FIG. 4 is a fragmentary elevational view of the roof storage compartment assembly of FIG. 1 illustrated in a first position.

FIG. 5 is a view similar to FIG. 4 of the roof storage compartment assembly illustrated in a second position.

FIG. 6 is a view similar to FIG. 4 of the roof storage compartment assembly illustrated in a third position.

DESCRIPTION OF THE PREFERRED EMBODIMENT(S)

Figure 1:
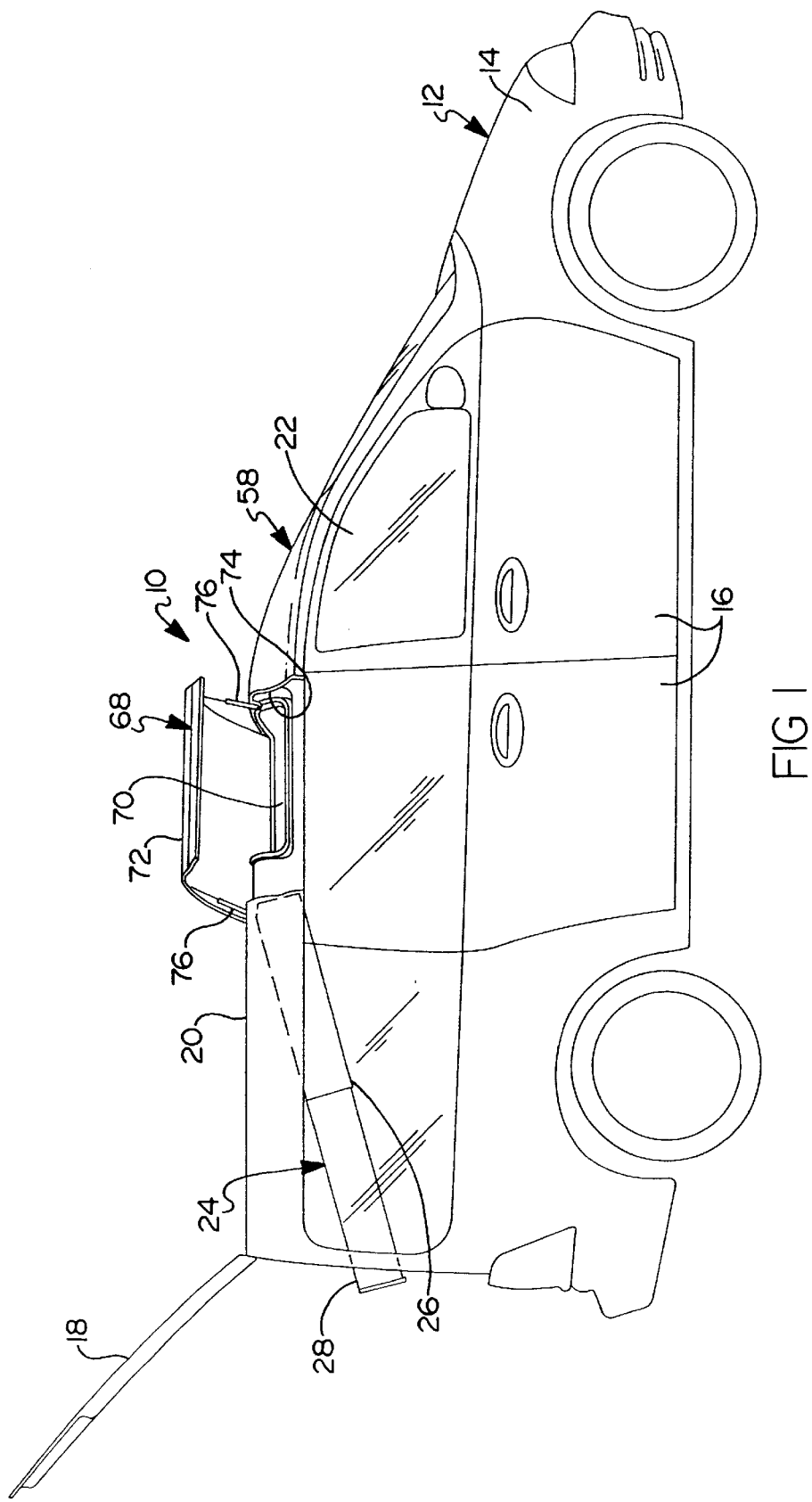
FIG. 1 is a side elevational view of a roof storage compartment assembly, according to the present invention, illustrated in operational relationship with a vehicle.
Figure 2:
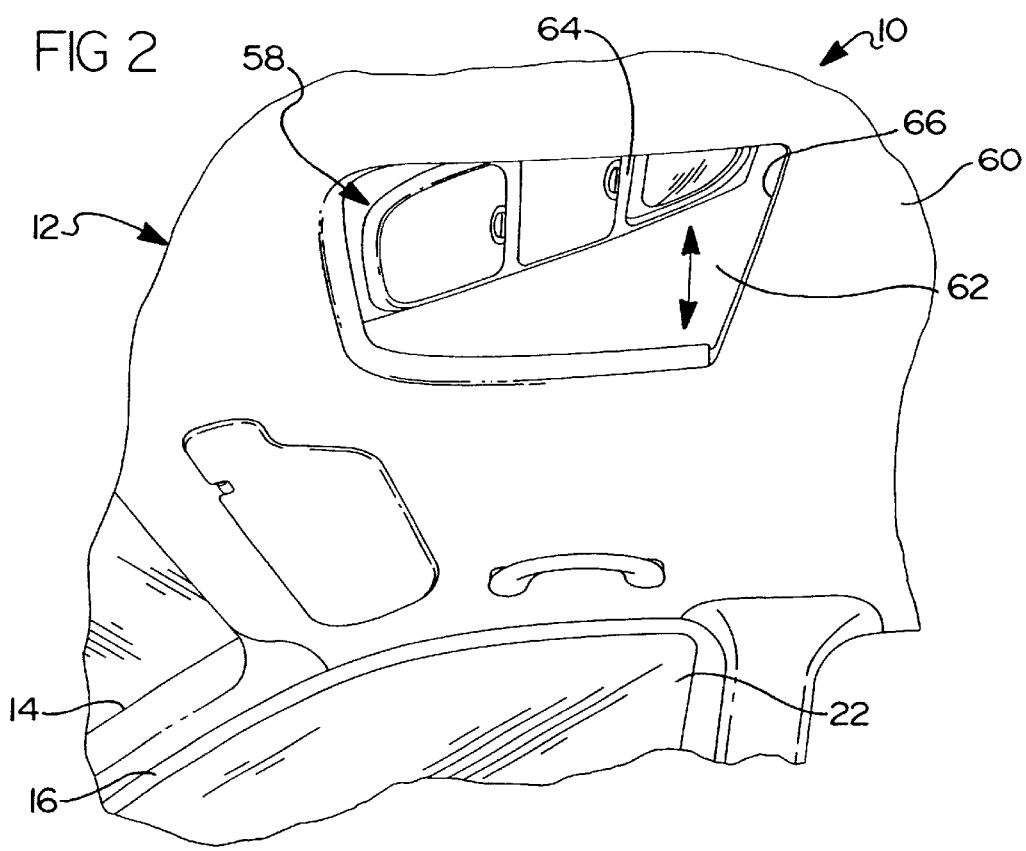
FIG. 2 is a perspective view of the roof storage compartment assembly from inside of the vehicle of FIG. 1.

Referring now to the drawings and in particular FIGS. 1 and 2, one embodiment of a roof storage compartment assembly 10, according to the present invention, is illustrated in connection with a vehicle such as a van, generally indicated at 12. Such vehicles 12 typically include a vehicle body 14 having side doors 16, a rear door 18, and a roof 20 forming an occupant compartment 22. The roof storage compartment assembly 10 is part of the roof 20 and is three separate storage compartments accessible from either the occupant compartment 22 or externally of the vehicle 12 in a manner to be described. It should be appreciated that, except for the roof storage compartment assembly 10, the vehicle 12 is conventional and known in the art.

Referring to FIGS. 1 through 6, the roof storage compartment assembly 10 includes a first storage compartment or tray assembly, generally indicated at 24, for containing cargo therein. The tray assembly 24 includes a tray holder 26 and a tray 28 cooperating with the tray holder 26. The tray holder 26 is generally rectangular in shape and has a bottom wall 30, a pair of side walls 32 spaced transversely and extending generally perpendicular to the bottom wall 30. The tray assembly 24 has a forward end of the side walls 32 of the tray holder 26 pivotally connected to a side portion 34 of the vehicle body 14 by suitable means such as pivot pins 36. It should be appreciated that the forward end of the tray holder 26 is pivotable or rotatable relative to the roof 20 of the vehicle body 14.

The tray assembly 24 also includes first and second bracket members 38 and 40, respectively, at a rearward end of the tray holder 26 for attaching the tray holder 26 to the side portion 34 of the vehicle body 14. Each of the bracket members 38 and 40 has a side wall 42 extending generally vertically and a base wall 44 extending from the side wall 42. The base wall 44 of each of the bracket members 38 and 40 is secured to the side portion 34 and side wall 32, respectively, by suitable means such as a fasteners (not shown) or welding. Each of the bracket members 38 and 40 have a cooperating mechanism 46 to allow the second bracket member 40 to be moved or lowered with respect to the first bracket member 38 without disengaging each other. It should be appreciated that the first and second bracket members 38 and 40 are conventional and known in the art.

The tray 28 is generally rectangular in shape and has a bottom wall 48, a pair of side walls 50 spaced transversely and extending generally perpendicular to the bottom wall 48, and an end wall 52 at a rear end of the side walls 50. The end wall 52 overlaps or extends over the side walls 50 to act as a stop with the ends of the side walls 32 of the tray holder 26. The tray 28 may include at least one cargo net (not shown) or collapsible divider (not shown) to hold objects (not shown) within the tray 28. It should be appreciated that the forward end of the tray 28 is open.

The tray assembly 24 also includes first and second track members 54 and 56, respectively, for attaching the side walls 50 of the tray 28 to the side walls 32 of the tray holder 26. The first track member 54 extends longitudinally and is secured to each side wall 50 of the tray 28 by suitable means such as a fasteners (not shown) or welding. The second track member 56 extends longitudinally and overlaps or telescopingly engages the first track member 54. The second track member 56 is secured to each side wall 32 of the tray holder 26 by suitable means such as fasteners (not shown) to allow relative movement therebetween. The second track member 56 is moveable relative to the first track member 54 and the tray holder 26 to allow the tray 28 to be extended or retracted relative to the tray holder 26. It should be appreciated that the first and second track members 54 and 56 are conventional and known in the art. It should also be appreciated that the tray assembly 24 may be accessed through the rear door 18 and pivoted and the tray 28 pulled out manually as illustrated in FIG. 1. It should further be appreciated that the tray 28 will allow objects to be stored therein such as groceries, etc.

Referring to FIG. 2, the roof storage compartment assembly 10 also includes a second storage compartment, generally indicated at 58, located between the roof 20 and a headliner 60 of the vehicle body 14 to store objects therein. The second storage compartment 58 includes a storage space 62 located between the roof 20 and the headliner 60 and an access door 64 for allowing access to the storage space 62 inside the occupant compartment 22 of the vehicle 12. The access door 64 is pivotally connected to the headliner 60 of the vehicle body 14 by suitable means such as hinges (not shown) to open and close an access opening 66 in the headliner 60 to allow access from inside the occupant compartment 22. It should be appreciated that the storage space 62 will allow small objects to be stored therein such as maps, papers, money, etc.

Figure 3:
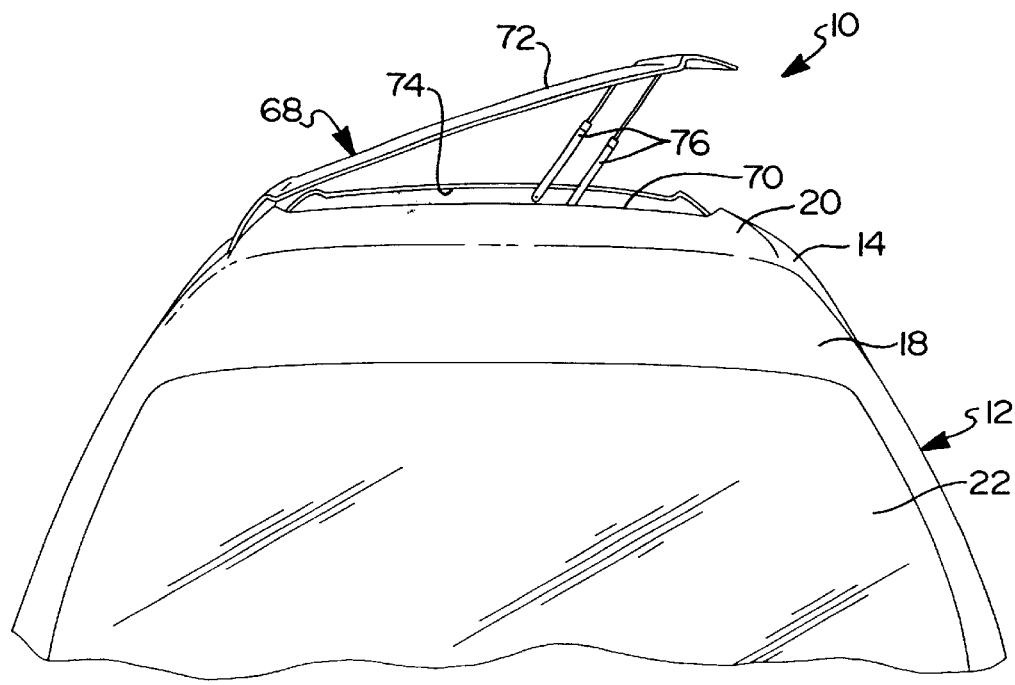
FIG. 3 is an elevational view of the roof storage compartment assembly of FIG. 1.

Referring to FIGS. 1 and 3, the roof storage compartment assembly 10 further includes a third storage compartment, generally indicated at 68, located in the roof 20 of the vehicle body 14 between the tray assembly 24 and storage space 62 to store objects therein. The third storage compartment 68 includes a cavity or recess 70 in the roof 20. The recess 70 is generally rectangular in shape and enclosed by lateral and longitudinal walls. The third storage compartment 68 includes an access door 72 located next to the rear door 18 and connected to the roof 20 of the vehicle body 14 by suitable means such as hinges (not shown). The access door 72 pivots upwardly to open an access opening 74 in the roof 20 to allow access externally of the vehicle body 14 to the interior of the recess 70. The access door 72 may also be connected to the roof 20 by a pair of damping elements 76 mounted to both sides of the access door 72 and the access opening 74. It should be appreciated that the damping elements 76 are conventional and known in the art. It should also be appreciated that the recess 70 will allow objects to be stored therein such as suitcases, etc.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A roof storage compartment assembly for a vehicle having a roof comprising:
   a plurality of storage compartments to be operatively connected to the roof; and
   one of said storage compartments being a tray assembly to be disposed within the vehicle and including a tray holder for pivotal connection to die roof to be pivoted and accessible from within the vehicle and a tray disposed in said tray holder to be extended and retracted linearly relative to said tray holder.

2. A roof storage, compartment assembly as set forth in claim 1 including a pair of tacks disposed on opposed sides of said tray and said tray holder to allow said tray to move outwardly from said tray holder.

3. A roof storage compartment assembly as set forth in claim 1 wherein said tray holder comprises a bottom wall and a pair of opposed side walls extending perpendicularly from said bottom wall.

4. A roof storage compartment assembly asset forth in claim 1 wherein said tray comprises a bottom wall, a pair of opposed side walls extending perpendicularly from said bottom wall and an end wall extending perpendicularly to said bottom wall and said side walls to close one end of said tray.

5. A roof storage compartment assembly as set forth in claim 1 including at least one access door for pivotal connection to the roof to allow access to contents within at least one of said storage compartments.

6. A roof storage compartment assembly as set forth in claim 5 wherein said at least one access door comprises a door for pivotal connection to the roof to pivot upward to open an access opening therein to allow access externally of the vehicle through said access opening.

7. A roof storage compartment assembly for a vehicle having a roof comprising:
   a plurality of storage compartments to be operatively connected to the roof;
   one of said storage compartments being a tray assembly to be disposed within the vehicle and for pivotal connection to the roof;
   wherein said tray assembly comprises a tray holder to be pivotally connected to the roof and a tray disposed in said tray holder and movable relative thereto; and
   wherein said tray assembly includes a pair of bracket members disposed on opposed sides of said tray holder at one end thereof for connection to the roof.

8. A roof storage compartment assembly for a vehicle having a roof comprising:
   a plurality of storage compartments to be operatively connected to the roof;
   one of said storage compartments being a tray assembly to be disposed within the vehicle and for pivotal connection to the roof;
   wherein said tray assembly comprises a tray holder to be pivotally connected to the roof and a tray disposed in said tray holder and movable relative thereto; and
   pivotal means for pivotally connecting a forward end of said tray holder to the roof.

9. A roof storage compartment assembly for a vehicle having a roof comprising:
   a plurality of storage compartments to be operatively connected to the roof;
   one of said storage compartments being a tray assembly to be disposed within the vehicle and for pivotal connection to the roof;
   at least one access door for pivotal connection to the roof to allow access to contents within at least one of said storage compartments; and
   wherein said at least one access door comprises a door for pivotally connection to the roof to pivot upward to open an access opening therein to allow access internally of the vehicle through said access opening.

10. A vehicle comprising:
    a vehicle body having a roof and sides extending from said roof;
    a plurality of storage compartments operatively connected to said roof;
    one of said storage compartments comprising a tray assembly disposed within said vehicle body and including a tray holder pivotally connected to said roof to be pivoted and accessible from within said vehicle body and a tray disposed in said tray holder to be extended and retracted linearly relative to said tray holder; and another of said storage compartments having an access door pivotally connected to said roof to allow access to contents therein.

11. A vehicle as set forth in claim 10 including a pair of tracks disposed on opposed sides of said tray and said tray holder to allow said tray to move outwardly from said tray holder.

12. A vehicle as set forth in claim 10 wherein said tray holder comprises a bottom wall and a pair of opposed side walls extending perpendicularly from said bottom wall.

13. A vehicle as set forth in claim 10 wherein said tray comprises a bottom wall, a pair of opposed side walls extending perpendicularly from said bottom wall and an end wall extending perpendicularly to said bottom wall and said side walls to close one end of said tray.

14. A vehicle as set forth in claim 10 wherein said at least one access door comprises a door pivotally connected to said roof to pivot upward to open an access opening therein to allow access externally of said vehicle body through said access opening.

15. A vehicle comprising:

a vehicle body having a roof and sides extending from said roof;

a plurality of storage compartments operatively connected to said roof;

one of said storage compartments comprising a tray assembly disposed within said vehicle body and pivotally connected to said roof;

another of said storage compartments having an access door pivotally connected to said roof to allow access to contents therein;

wherein said tray assembly comprises a tray holder pivotally connected to said roof and a tray disposed in said tray holder and movable relative thereto; and wherein said tray assembly includes a pair of bracket members disposed on opposed sides of said tray holder at one end thereof and connected to said roof.

16. A vehicle comprising:

a vehicle body having a roof and sides extending from said roof;

a plurality of storage compartments operatively connected to said roof;

one of said storage compartments comprising a tray assembly disposed within said vehicle body and pivotally connected to said roof;

another of said storage compartments having an access door pivotally connected to said roof to allow access to contents therein;

wherein said tray assembly comprises a tray holder pivotally connected to said roof and a tray disposed in said tray holder and movable relative thereto; and pivotal means for pivotally connecting a forward end of said tray holder to said roof.

17. A vehicle comprising:

a vehicle body having a roof and sides extending from said roof;

a plurality of storage compartments operatively connected to said roof;

one of said storage compartments comprising a tray assembly disposed within said vehicle body and pivotally connected to said roof;

another of said storage compartments having an access door pivotally connected to said roof to allow access to contents therein; and wherein said at least one access door comprises a door pivotally connected to said roof to pivot upward to open an access opening therein to allow access from an interior of said vehicle body through said access opening.

18. A van comprising:

a vehicle body having a roof and sides extending from said roof;

a plurality of storage compartments operatively connected to said roof;

one of said storage compartments comprising a tray assembly disposed within said vehicle body and comprising a tray holder pivotally connected to said roof to be pivoted and accessible from within said vehicle body and a tray disposed in said tray holder to be extended and retracted linearly relative to said tray holder; and another of said storage compartments having an access door pivotally connected to said roof to allow access to contents therein.

* * * * *